Sept. 28, 1943.   W. J. COULTAS ET AL   2,330,687
TRACTOR MOWER
Filed July 4, 1942   3 Sheets-Sheet 2

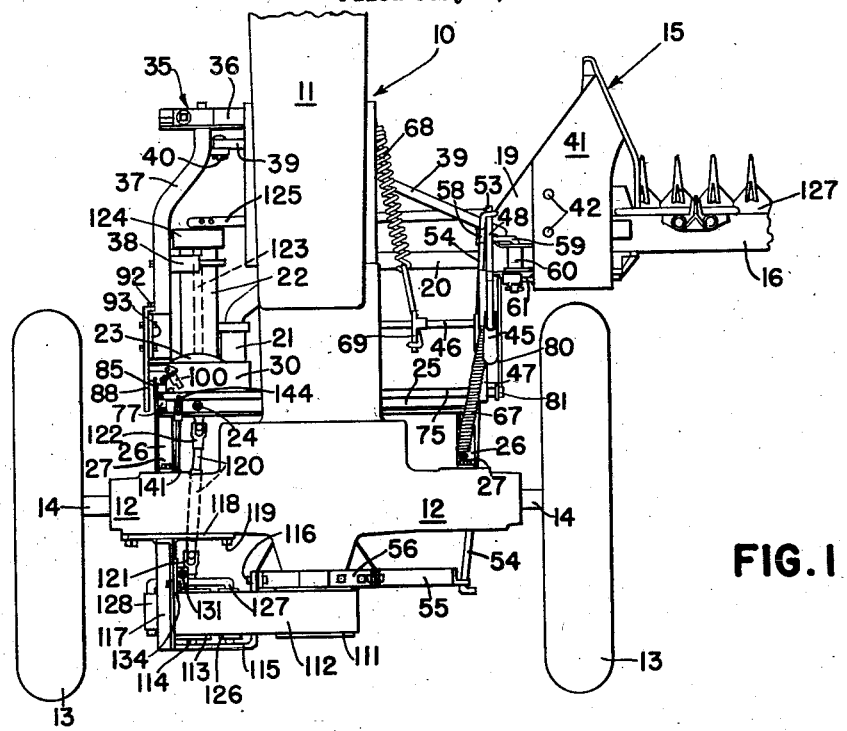

INVENTORS
Wilbur J. Coultas
Ellsworth T. Johnson
BY
ATTORNEYS

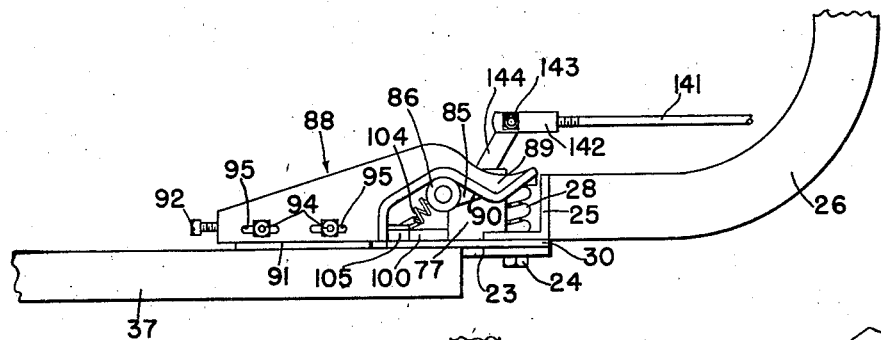
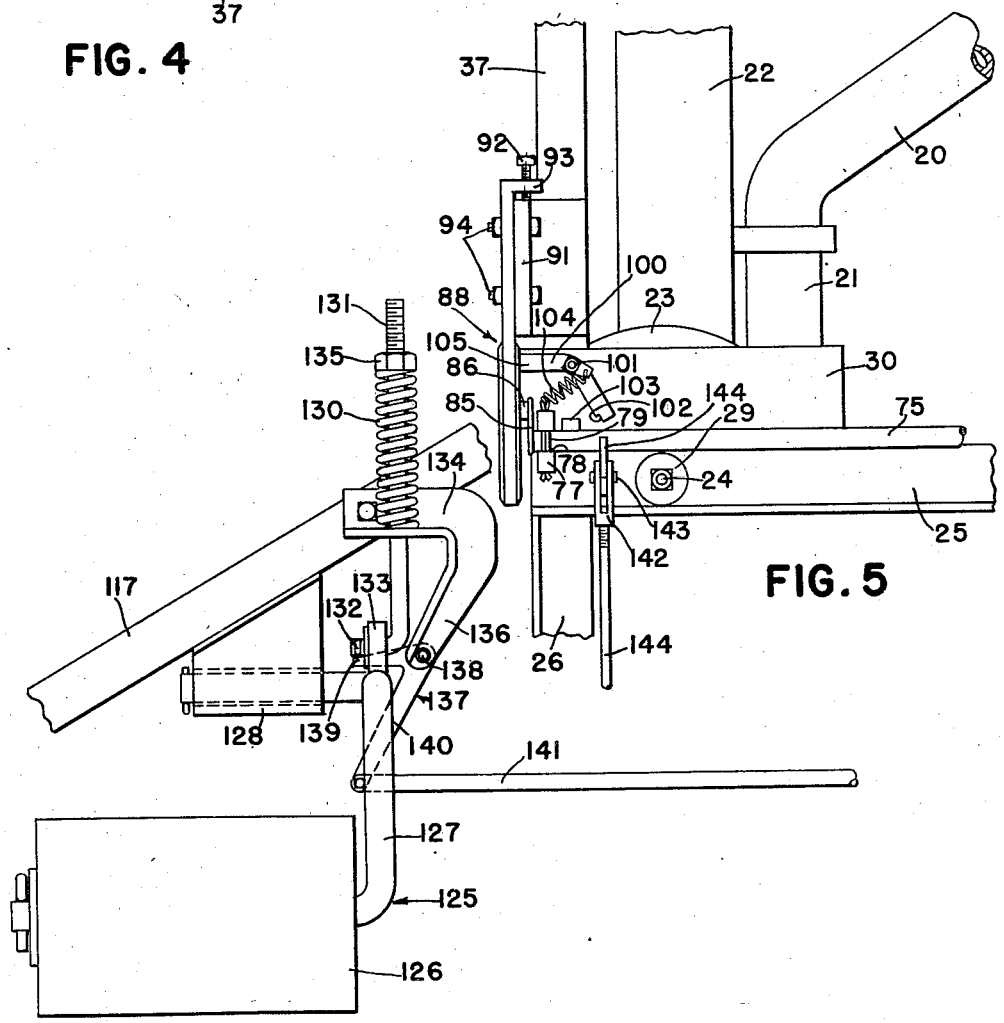

Patented Sept. 28, 1943

2,330,687

UNITED STATES PATENT OFFICE 2,330,687

TRACTOR MOWER

Wilbur J. Coultas and Ellsworth T. Johnson, Moline, Ill., assignors to Deere & Company, Moline, Ill., a corporation of Illinois Application July 4, 1942, Serial No. 449,813

12 Claims. (Cl. 56—25)

The present invention relates generally to tractor mowers and more particularly to that type of tractor mower which is pivotally mounted on the body of the tractor for swinging movement in a horizontal plane, whereby when the cutter bar encounters an obstruction in the field during operation, the mower is released and swings rearwardly to clear the obstruction. When the mower swings back, it is desirable to interrupt the power connection to the sickle to avoid damage to the cutting apparatus and also possible injury to the operator in case he should have to get off the tractor. It is also desirable that the power connection be reestablished automatically when the cutter bar and its support are returned to their normal operating position.

In those arrangements in which the pivoted mower support is located adjacent a power shaft, this is accomplished in a relatively simple manner by driving a pulley mounted on the pivoted mower support from a pulley on the power shaft by means of a belt, which is loosened by movement of the driven pulley with the mower support. For example, when the mower is mounted ahead of the tractor wheels and power is taken from the transmission shaft of the tractor ahead of the tractor wheels, as is shown in application, Serial No. 257,804, filed February 23, 1939, by W. J. Coultas and issued August 11, 1942 as Patent No. 2,292,362, the driven pulley is mounted on the mower support beneath the tractor transmission shaft and is connected to a pulley on the latter by a belt which is loosened when the driven pulley moves toward the driving pulley. Furthermore, when the mower is mounted on the rear of the tractor behind the traction wheels and there is a power take-off shaft available at the rear of the tractor, a similar arrangement can be made, as shown in Patent 2,275,259, granted to Johnson et al., March 3, 1942. However, where the mower is disposed beneath the tractor ahead of one of the traction wheels and the power take-off shaft extends rearwardly from the rear end of the tractor, or vice versa, this simple direct connection cannot be used and the problem becomes somewhat more difficult.

It is therefore the principal object of the present invention to provide a simple but effective power connection between a mower and the power take-off shaft of the tractor, disposed in separated locations on the tractor, which will automatically interrupt the power transmission to the cutting apparatus when the mower swings rearwardly, but will also automatically reestablish the power connection when the mower is returned to its normal operating position.

Other objects and advantages of this invention will be apparent to those skilled in the art after a consideration of the following description, in which reference is had to the drawings appended hereto, in which Figure 1 is a partial plan view of a tractor mounted mower embodying the principles of the present invention;

Figure 2 is a rear elevational view of the embodiment of Figure 1;

Figure 4 is a side elevational view, drawn to an enlarged scale, of one of the details of the mechanism;

Figure 5 is a plan view of the details of the mechanism shown in Figure 4; and

Figure 6 is a side elevational view, drawn to an enlarged scale, of another detail of the mechanism of the present invention.

Figure 3:
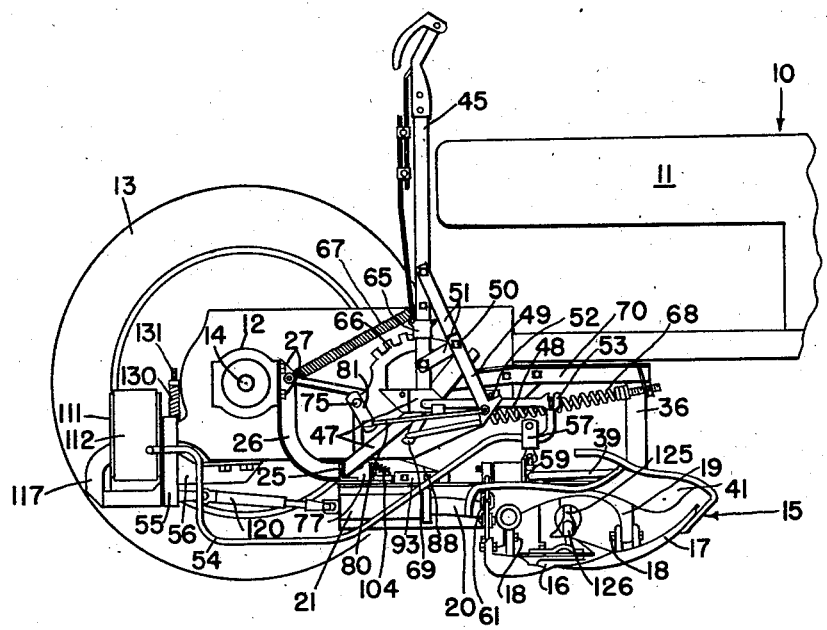
Figure 3 is a side elevational view taken from the mower side of the tractor, with the adjacent tractor wheel removed to more clearly show the details of construction.

Referring now to the drawings, the tractor indicated in its entirety by reference numeral 10, comprises a narrow longitudinally extending body 11, a pair of oppositely extending transverse rear axle housings 12, and a pair of rear traction wheels 13 mounted on axles 14 which project from the axle housings 12 at opposite sides of the tractor.

The mower is indicated generally by reference numeral 15 and comprises a transversely disposed cutter bar 16 disposed ahead of one of the rear tractor wheels 13 and extending laterally outwardly of the plane of such wheel. The inner end of the cutter bar 16 is carried on a mower shoe 17, best shown in Figure 3, which is pivotally connected by bolts 18 to a more or less conventional shoe arch 19. The arch 19 is mounted on the outer end of a cutter bar supporting arm 20, which extends beneath the tractor and has its inner end turned rearwardly into a bearing 21, providing for vertical swinging movement of the arm 20 and cutter bar about a fore and aft extending axis. The bearing sleeve 21 is mounted rigidly alongside a drive shaft housing 22 on a horizontal plate 23, which is pivotally connected by means of a vertical bolt 24 to a transverse angle frame member 25 disposed beneath the tractor body 11. The frame member 25 is carried at opposite ends thereof, respectively, on a pair of upwardly curved supports 26, the upper ends of which are secured by bolts 27 to the usual implement mounting bosses on the forward side of the tractor axle housings 12. A coil compression spring 28 encircles the bolt 24 between the angle frame member 25 and a washer 29, for the purpose of holding the plate 23 together with the bearing sleeve 21 and housing 22 tightly up against the frame member 25 but providing for generally horizontal swinging movement about the axis of the bolt 24. A plate 30 is rigidly welded to the frame member 25 above the plate 23 to provide a bearing surface for the plate 23, in order to prevent the weight of the mower supporting structure from bending the pivot bolt 24.

The mower is retained in normal operating position with the cutter bar extending laterally outwardly of the tractor ahead of the tractor wheel 13, by means of a suitable spring latch device 35, of a type which is shown in more detail in the above-identified Coultas application. The latch mechanism 35 is mounted on a standard 36, which is rigidly mounted on the tractor frame beneath the body 11. The latch mechanism 35 engages the forward end of an arm 37, which is rigidly attached by means of a bracket 38 to the forward end of the drive shaft housing 22, and at its rear end is fixed to the housing 22 and the plate 23. The forward end of the arm 37 is also connected by a drag link 39 to the shoe arch 19, for the purpose of bracing the cutter bar and supporting arm 20 against bending rearwardly. The inner end of the drag link 39 is connected to the arm 37 by a pivot bolt 40 disposed on a fore and aft extending axis generally in alignment with the axis of the sleeve 21, in order to permit the cutter bar 16 and arm 20 to swing vertically during operation as the cutter bar is raised or lowered.

When the cutter bar 16 meets an obstruction in the field during operation, the forward end of the arm 37 breaks away from the spring latch 35, and the mower structure including the cutter bar 16, supporting arm 20, housing 22, and arm 37, swings horizontally as a unit about the vertical axis of the pivot bolt 24. The shoe arch 19 is provided with a ramp 41, rigidly attached thereto by bolts 42, over which the adjacent traction wheel 13 rolls as the mower swings rearwardly, thereby permitting the cutter bar to pass beneath the wheel 13 to a trailing position behind the tractor, as disclosed more in detail in the above-identified Coultas application.

The cutter bar is raised and lowered by means of a manually operable lever 45, which is swingably mounted on a crank arm 46, the latter being journaled on a rigid framework 47 for rocking movement about a transverse axis and having a forwardly extending arm portion 48 on the outer end thereof. The arm 48 is connected with the hand lever 45 by means of a latch arm 49, which is pivotally mounted on a bolt 50 on a pair of rigid braces 51 fixed to the lever 45. The latch 49 is thus swingable in a vertical plane about the axis of the bolt 50 and is engageable with a lug 52, rigidly welded to the intermediate portion of the arm 48. The forward end of the arm 48 is provided with a hooked portion 53, which supports the forward end of a track member 54, the latter comprising a cylindrical rod extending horizontally rearwardly for a short distance and then curving downwardly beneath the tractor axle housing 12, the rear end of the rod 54 being bent upwardly and suspended on a frame member 55, which is rigidly bolted to the tractor draft frame 56. The cutter bar is suspended from this track 54 by means of a clevis 57 in which is journaled a small roller 58. The clevis 57 is connected to the usual bell crank 59, swingably supported in a bearing lug 60 on the top of the shoe arch 19, and the crank arm 59 is connected by a link 61 to the mower shoe 17 in a manner well-known to those skilled in the art.

Thus, it will be evident that when the hand lever 45 is swung rearwardly, the latch arm 49 raises the crank arm 48 through the lug 52, which in turn lifts the track member 54, and roller sheave 57, thus raising the cutter bar to any desired position above the ground. The lever 45 is secured in any desired elevated position by means of a latch 65 engaging the notched sector 66, which is rigidly attached to the framework 47 mounted on the transverse frame members 25, 26. The forward portion of the sector 66 is smooth, to permit the cutter bar to float along the ground when the lever 45 is set forth in a forward position, and the lever 45 is urged rearwardly by a light tension spring 67 connected between the lever 45 and the frame member 26 in order to hold the lever 45 in a more or less vertical position within reach of the operator. A counterbalancing spring 68 is connected to an arm 69 on the crank arm 46, and extends forwardly therefrom and is anchored to a frame member 70 which is rigidly attached to the tractor frame. The spring 68 tends to raise the cutter bar and thus relieves a portion of its weight from the hand lever 45.

Normally the roller 58 hangs on the horizontal forward portion of the track member 54 so that the setting of the hand lever 45 determines the height of operation of the cutter bar shoe 17. When the cutter bar 16 encounters an obstruction, however, the cutter bar swings rearwardly about the pivot bolt 24 and thus disengages the forward end of the latch arm 37 from the latch mechanism 35. It is then necessary for the rear wheel 13 of the tractor to ride up over the ramp 41 and thus it is necessary to drop the cutter bar from its raised position in order to permit the wheel to ride over the ramp. This is accomplished by swinging the latch hook 49 out of engagement with the projecting lug 52 to allow the arm 48 and track 54 to drop with the cutter bar.

The mechanism for disengaging the latch hook 49 includes a transversely disposed rockshaft 75, journaled at its right hand end on the supporting bracket for the sector 66, and at its left hand end in a bearing support 77, which is mounted on the supporting plate 30. The bearing 77 is slotted at 78 to receive the rockshaft 75, the latter being retained in the slot by a suitable cotter pin 79. The latch hook 49 is connected by a link 80 to an arm 81 fixed to the rockshaft 75. Thus it is evident that by rocking the rock shaft 75 to swing the arm 81 rearwardly, the latch hook 49 is swung rearwardly about its pivot bolt 50, disengaging its lower hooked end from the projecting lug 52 on the arm 48.

The rockshaft 75 is rocked by means of a pair of camming elements at the opposite end of the rockshaft, best shown in Figures 4 and 5. This end of the rockshaft is provided with an arm 85, on the end of which is journaled a camming roller 86. Fixed to the forwardly extending arm 37 is a camming element 88 having a rearwardly projecting nose 89, which extends over the camming roller 86 and has on its under side a downwardly and rearwardly extending camming surface 90, which bears against the roller 86 as the mower swings about the pivot bolt 24, forcing the arm 85 downwardly and rocking the rockshaft 75 and thereby swinging the opposite arm 81 rearwardly. The camming member 88 is supported on a vertically disposed longitudinally extending flange portion 91 on the arm 37 and is adjusted in a fore and aft direction by means of a set screw 92, which engages a threaded aperture in a flange 93 on the forward end of the camming member 88, and extends therethrough and bears against the end of the flange 93. The camming member 88 is secured to the flange 93 in adjusted position by means of a pair of bolts 94, extending through apertures in the flange 91 and through longitudinally extending slots 95 in the camming member 88. Thus the camming member 88 can be adjusted fore and aft to adjust the relation between the rocking of the rockshaft and the swinging of the cutter bar structure in order to insure that the latch hook 49 is disengaged from the projecting lug 52 at the proper time.

The rockshaft 75 is held in fixed position after it has been rocked by the camming member 88 to disengage the latch hook 49. This is accomplished by means of a detent member 100 in the form of a bell crank pivoted intermediate its ends by a bolt 101 to the plate 30, and having a notched end 102, which engages a downwardly extending lug 103 on the rockshaft 75. The detent member 100 is urged toward holding position by means of a coil spring 104 which is anchored to the cotter pin 79. The detent 100 is held in disengaged position against the action of the spring 104, when the mower is in normal operating position, by the opposite end 105 of the bell crank, which is engaged by the rear edge of the camming member 88. Thus, when the cutter bar 16 encounters an obstruction and disengages the arm 37 from the latch 35, upon rearward swinging movement of the cutter bar structure the camming member 88 moves forwardly relative to the camming roller 86 and forces the latter downwardly to rock the rockshaft 75, and thereby swinging the arm 81 rearwardly together with the latch hook 49. At the same time, the camming member 88 moves forwardly away from the detent member 100 and thereby allows the spring 104 to swing the detent into the engaged position, whereupon the notched end 102 engages the downwardly extending lug 103 and holds the rockshaft in a position in which the latch hook 49 is retracted. When the mower is returned to normal operating position, the detent member 88 swings rearwardly once more into engagement with the end 105 of the bell crank 100 and disengages the latter from the rockshaft lug 103, thereby allowing the rockshaft to be returned to normal position by spring means which will be described later.

Most of the details thus far described are also shown and claimed in Patent No. 2,288,950, granted July 7, 1942 to Johnson et al. In that patent the power for driving the mowing mechanism was derived from the transmission shaft of the tractor directly above the mower structure. In the present embodiment, however, the tractor is of the type having a rearwardly extending power take-off shaft at the rear of the tractor body, and it is therefore necessary to transmit the driving power forwardly to the mowing mechanism and also to provide automatic control means for disconnecting the power when the cutter bar swings rearwardly.

The power take-off shaft 110, which projects from the rear of the tractor drive housing 12, is provided with a belt pulley 111, over which is trained a belt 112, which drives a pulley 113, which is journaled on an axle 114, fixed to a frame member 115. The frame member 115 is connected by bolts 116 to the tractor draft frame 56 and extends rearwardly and laterally, the opposite end being carried on a supporting member 117, which inclines forwardly and upwardly and is rigidly secured, as by welding, to a mounting plate 118, the latter being detachably secured by bolts 119 to the conventional implement supporting bosses on the rear of the axle housing 12. The pulley 113 is coupled to a forwardly extending power shaft 120 comprising pair of telescoping sections connected through a universal joint 121 to the pulley 113 and at the forward end the shaft 120 is connected through a universal joint 122 to a power shaft 123 journaled within the drive housing 22, and extending forwardly therethrough. The forward end of the shaft 123 extends from the front of the housing 22 and supports a flywheel 124, to which a conventional pitman 125 is connected and extends laterally beneath the tractor to the usual ball and socket joint 126 at the inner end of the mower sickle 127. By virtue of the telescoping shaft 120, the mower structure can swing about the vertical axis of the pivot bolt 24, while maintaining a connection with the pulley 113.

The belt 112 is normally loose on the two pulleys 111, 113, but is maintained tightly in driving relation with the latter by means of a belt tightener 125 comprising an idler pulley 126 journaled on the end of a crank arm 127, which is swingably supported at its opposite end in a bearing support 128 fixed to the support 117. The supporting end of the crank arm 127 is turned rearwardly and disposed on a fore and aft extending axis to provide for vertical swinging movement with the axis of the idler pulley 126 maintained parallel with the axes of the pulleys 111, 113. The idler pulley 126 is urged upwardly against the lower or slack side of the belt 112 by means of a coil compression spring 130, which encircles a hanger rod 131, the lower end 132 of which is hooked into a lug 133 welded to the crank arm 127 intermediate the ends thereof. The hanger 131 extends upwardly therefrom, through an aperture in a bracket 134, which is rigidly bolted to the side of the supporting frame member 117. The compression spring 130 bears upwardly against a nut 135 threaded on the end of the hanger rod 131 and reacts downwardly against a flange on the bracket 134. Thus, by means of the compression spring 130 the idler pulley 126 is urged upwardly to tighten the belt and thus complete the power transmitting connection between the power take-off shaft 110 and the sickle 127.

The bracket 134 has a downwardly extending portion 136, at the lower end of which is pivotally mounted a bell crank 137 on a bolt 138, providing for swinging movement of the bell crank 137 about a transverse axis. One arm 139 of the bell crank 137 extends rearwardly from the pivot 138 and overlies the idler arm 127 between the lug 133 and the bearing support 128. The other arm 140 of the bell crank extends downwardly from the pivot 138 and at the lower end is pivotally connected a linkage rod 141, which extends forwardly therefrom beneath the tractor axle housing 12. The forward end of the link 141 is provided with a clevis 142 which is pivotally connected by a bolt 143 to an arm 144 on the rockshaft 75. The arm 144 is rigidly welded to the rockshaft 75 and extends upwardly therefrom, so that when the mower frame swings about the pivot bolt 24, the camming surface 90, acting against the roller 86, rocks the rockshaft to swing the arm 144 forwardly, thereby actuating the bell crank 137 to force the idler arm 127 downwardly against the action of the compression spring 130. This relieves the pressure of the idler pulley 126 against the belt 112, loosening the latter and interrupting the transmission of power from the power take-off shaft. As described above, the rockshaft 75 is locked during the time the mower is out of its normal operating position, by the detent member 100 engaging the lug 103, and thus holds the idler away from the belt until the mower swings back to normal position, releasing the detent 100 and allowing the spring 130 to restore the idler arm 127 and also acting through the bell crank 137 and link 141 to return the rockshaft 75 to normal position. Thus, it is clear that the rockshaft 75, with its camming and locking means, accomplishes the dual purpose of releasing the latch member 49 allowing the mower to drop to the ground to permit the tractor wheel to roll over the ramp, and also to force the belt tightener to disabled position against the action of its spring, to disconnect the mowing mechanism from the source of power.

The mower can be easily restored to operating position by maneuvering the tractor backwards to roll the wheels back over the ramp. The latch 35 releases the arm 37 and the power connection is reestablished automatically, but the mower must be manually raised to an elevated cutting position, if so desired, by swinging the lever 45 forwardly until the latch hook 49 is lowered to snap over the lug 52, after which the mower can be raised by pulling back on the hand lever 45.

We claim:

1. A tractor mower comprising in combination, a cutter bar supporting member adapted to be mounted on a tractor and swingable relative thereto in a generally horizontal plane, a drive pulley adapted to receive power from the tractor engine, a driven pulley rotatably disposed on an axis fixed with respect to the axis of said drive pulley, a belt connecting said pulleys, a belt tightener shiftably disposed in engagement with the slack side of said belt, spring means urging said tightener against said slack side to tighten the belt, flexible power transmitting means for connecting said driven pulley with mower mechanism carried on said cutter bar supporting member in any position of the latter within the range of its swinging movement, and lever means connecting said supporting member with said belt tightener for shifting the latter away from said belt in opposition to said spring means by force derived from swinging movement of said supporting member.

2. A tractor mower comprising in combination, a cutter bar supporting member adapted to be mounted on a tractor and swingable relative thereto in a generally horizontal plane, a drive pulley adapted to receive power from the tractor engine, a driven pulley rotatably disposed on an axis fixed with respect to the axis of said drive pulley, a belt connecting said pulleys, a belt tightener shiftably disposed in engagement with the slack side of said belt, means biasing said tightener thereagainst to tighten the belt, flexible power transmitting means for connecting said driven pulley with mower mechanism carried on said cutter bar supporting member, in any position of the latter within the range of its swinging movement, camming means between said supporting member and said belt tightener for forcibly shifting the latter against said biasing means away from said belt by the initial swinging movement of said supporting member.

3. A tractor mower comprising in combination, a cutter bar supporting member adapted to be mounted on a tractor and swingable relative thereto in a generally horizontal plane, a drive pulley adapted to receive power from the tractor engine, a driven pulley rotatably disposed on an axis fixed with respect to the axis of said drive pulley, a belt connecting said pulleys, a belt tightener shiftably disposed in engagement with the slack side of said belt and biased thereagainst to tighten the belt, flexible power transmitting means for connecting said driven pulley with mower mechanism carried on said cutter bar supporting member, in any position of the latter within the range of its swinging movement, lever means connecting said supporting member with said belt tightener for shifting the latter away from said belt by swinging movement of said supporting member, and locking means responsive to movement of said supporting member out of its normal mowing position for locking said belt tightener in its inactive position against said bias, urging said tightener against said belt.

4. A machine of the class described, comprising in combination, a mobile frame, a support pivoted on said frame for horizontal swinging movement, cutting mechanism attached to said support, a drive pulley, a driven pulley mounted on said frame and having a flexible power transmitting connection with said cutting apparatus, a normally loose belt about said pulleys, an idler pulley biased to tighten said belt, a pair of camming elements on said frame and on said support, respectively, and connected with said idler, said elements being interengageable to shift said idler pulley away from said belt against its biasing force when said support moves out of a certain position relative to said frame.

5. A machine of the class described, comprising in combination, a mobile frame, a support pivoted on said frame for horizontal swinging movement, cutting mechanism attached to said support, a drive pulley, a driven pulley mounted on said frame and having a flexible power transmitting connection with said cutting apparatus, a normally loose belt about said pulleys, an idler pulley on said frame, spring means urging said idler against said belt to tighten the latter, lever means connecting said support and said idler to force the latter against the action of said spring means to loosen the belt when said support swings out of a certain position on said frame, and locking means for holding said idler in inactive position.

6. The combination set forth in claim 5, with the further provision of means for unlocking said locking means responsive to the return of said support to said certain position on the frame.

7. A machine of the class described, comprising in combination, a mobile frame, a support pivoted on said frame for horizontal swinging movement, cutting mechanism attached to said support, a drive pulley, a driven pulley mounted on said frame and having a flexible power transmitting connection with said cutting apparatus, a normally loose belt about said pulleys, an idler pulley on said frame, spring means urging said idler against the belt to tighten the latter, a pair of camming elements on said frame and on said support, respectively, and connected with said idler, said elements being interengageable to force said idler against the action of said spring away from said belt as the support swings out of a normal position on said frame, a locking dog mounted on said frame and swingable into engagement with means connected to the idler to lock the latter in inactive position, and means on said support engageable with said locking dog in said normal position, to release the latter upon return of said support to said normal position.

8. A machine of the class described, comprising in combination, a mobile frame, a support pivoted on said frame for horizontal swinging movement, cutting mechanism attached to said support, a drive pulley, a driven pulley mounted on said frame and having a flexible power transmitting connection with said cutting apparatus, a normally loose belt about said pulleys, an idler pulley on said frame, means biasing said pulley against the belt to tighten the latter, a rockable member mounted on said frame, a pair of cooperative camming elements on said support and said rockable member, respectively, and lever means connecting said member with said idler to shift the latter against said biasing means when said member is rocked, said camming elements being adapted to interengage to rock said member by swinging movement of said support.

9. A machine of the class described, comprising in combination, a mobile frame, a support pivoted on said frame for horizontal swinging movement, cutting mechanism attached to said support, a drive pulley, a driven pulley mounted on said frame and having a flexible power transmitting connection with said cutting apparatus, a normally loose belt about said pulleys, an idler pulley on said frame, means biasing said pulley against the belt to tighten the latter, a control lever for adjusting said cutting mechanism, a latch for connecting said lever with said cutting mechanism, a rockshaft mounted on said frame, connections between said rockshaft and said idler and said latch, respectively, and a pair of cooperative camming elements on said support and said rockshaft, respectively, and adapted to interengage to rock said rockshaft upon movement of said support out of a normal position on said frame.

10. A machine of the class described, comprising in combination, a mobile frame, a support pivoted on said frame for horizontal swinging movement, a cutter bar swingably attached to said support for vertical movement, a hand lever mounted on said frame for adjusting the height of the cutter bar during operation, disengageable latch means normally connecting said lever with said cutter bar, a drive pulley and a driven pulley mounted on said frame, said driven pulley having a flexible power transmitting connection with said cutter bar, a normally loose belt about said pulleys, an idler pulley biased to tighten said belt, a rockshaft mounted on said frame, connections between said rockshaft and said idler and said latch, respectively, to release the idler and latch simultaneously upon rocking of the rockshaft, a pair of cooperative camming elements on said support and said rockshaft, respectively, and adapted to interengage to rock said rockshaft upon movement of said support relative to said frame from a normal operating position, and a disengageable locking dog on said frame for locking said rockshaft to hold the latter in rocked position when the support is out of said normal position, said dog being engaged by a part on said support to release said dog when the support returns to said normal position.

11. A tractor mower for a tractor having a power take-off shaft extending rearwardly from the rear end of the body, comprising in combination, a cutter bar support pivotally mounted beneath the tractor for horizontal swinging movement, a cutter bar attached to said support and extending laterally from the side of the tractor ahead of one of the rear wheels thereof, cutting mechanism associated with the cutter bar, a flexible power shaft connected with said cutting mechanism and extending rearwardly, a pulley mounted on the rear of the tractor and connected with said power shaft, a drive pulley mounted on the tractor power take-off shaft, a normally loose belt about said pulleys, a belt tightener shiftably disposed in engagement with said belt and biased to tighten the latter, and linkage means connected to said tightener and extending forwardly and having an operative connection with said pivoted support, and adapted to force said tightener against its biasing force away from said belt by movement of said support about its pivot.

12. A tractor mower for a tractor having a power take-off shaft extending rearwardly from the rear end of the body, comprising in combination, a cutter bar support pivotally mounted beneath the tractor for horizontal swinging movement, a cutter bar attached to said support and extending laterally from the side of the tractor ahead of one of the rear wheels thereof, cutting mechanism associated with the cutter bar, a flexible power shaft connected with said cutting mechanism and extending rearwardly, a pulley mounted on the rear of the tractor and connected with said power shaft, a drive pulley mounted on the tractor power take-off shaft, a normally loose belt about said pulleys, a belt tightener shiftably disposed in engagement with said belt and biased to tighten the latter, linkage means connected to said tightener and extending forwardly, a camming element on said support, a second camming element connected to said linkage means, said elements interengaging when said support swings out of a normal operating position to shift said tightener away from the belt against its biasing force.

WILBUR J. COULTAS.
ELLSWORTH T. JOHNSON.